(12) United States Patent
Choi et al.

(10) Patent No.: US 9,520,926 B2
(45) Date of Patent: Dec. 13, 2016

(54) METHOD AND APPARATUS FOR TRANSMITTING BEAMFORMING REPORT FRAME FOR TRANSMIT BEAMFORMING

(71) Applicant: Electronics and Telecommunications Research Institute, Daejeon (KR)

(72) Inventors: Jee Yon Choi, Daejeon (KR); Je Hun Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 155 days.

(21) Appl. No.: 14/249,317

(22) Filed: Apr. 9, 2014

(65) Prior Publication Data

US 2014/0307722 A1    Oct. 16, 2014

(30) Foreign Application Priority Data

Apr. 16, 2013 (KR) .................. 10-2013-0041497

(51) Int. Cl.
*H04W 4/00* (2009.01)
*H04B 7/06* (2006.01)
*H04W 16/28* (2009.01)

(52) U.S. Cl.
CPC .......... *H04B 7/0617* (2013.01); *H04B 7/0645* (2013.01); *H04W 16/28* (2013.01)

(58) Field of Classification Search
CPC ..................................................... H04W 24/10
USPC ........................................................ 370/338
See application file for complete search history.

(56) References Cited

U.S. PATENT DOCUMENTS

| 2010/0248635 | A1  | 9/2010 | Zhang et al. | |
|---|---|---|---|---|
| 2011/0159866 | A1* | 6/2011 | Kim | H04B 7/0417 |
| | | | | 455/422.1 |
| 2011/0199968 | A1* | 8/2011 | Kim | H04B 7/0617 |
| | | | | 370/328 |
| 2014/0269461 | A1* | 9/2014 | Mehta | H04L 5/06 |
| | | | | 370/297 |

FOREIGN PATENT DOCUMENTS

| KR | 10-2007-0087725 A | 8/2007 |
|---|---|---|
| KR | 10-2012-0064092 A | 6/2012 |
| WO | WO 2011/028680 A1 | 3/2011 |

* cited by examiner

*Primary Examiner* — Shripal Khajuria (57) ABSTRACT

A method of transmitting a beamforming report frame for transmit beamforming is provided. The method may include acquiring, by a receiver, data of a signal transmitted by a transmitter, selecting either media access control (MAC) software or MAC hardware, to assign a sequence number based on a type of the data, and assigning a sequence number to the management frame based on the data, using either the MAC software or MAC hardware that is selected.

13 Claims, 7 Drawing Sheets

METHOD AND APPARATUS FOR TRANSMITTING BEAMFORMING REPORT FRAME FOR TRANSMIT BEAMFORMING

CROSS-REFERENCE TO RELATED APPLICATION

This application claims the benefit of Korean Patent Application No. 10-2013-0041497, filed on Apr. 16, 2013, in the Korean Intellectual Property Office, the disclosure of which is incorporated herein by reference.

BACKGROUND

1. Field of the Invention

The present invention relates to a Method and apparatus for transmitting a beamforming report frame for transmit beamforming.

2. Description of the Related Art

Recently, in a wireless communication system, a multiple-input and multiple-output (MIMO) technology of transceiving data using at least two antennas is being generalized. A wireless local area network (WLAN) also enables at least two transmitting antennas to be used from the Institute of Electrical and Electronics Engineers (IEEE) 802.11n standard. The IEEE 802.11n standard allows up to four antennas, and the IEEE 802.11ac standard allows up to eight antennas. For example, when a plurality of transmitting antennas are used, data may be transmitted using a transmit beamforming technology to improve a receiving performance of a signal.

To use the transmit beamforming technology, a terminal for transmission, hereinafter referred to as a "beamformer," needs to know channel information of a terminal for reception, hereinafter referred to as a "beamformee." A protocol used by the beamformer to acquire the channel information of the beamformee is called a "sounding protocol."

When receiving of a null data packet announcement (NDPA) and a null data packet (NDP) is finished, and when a short interframe space (SIFS) elapses, the beamformee needs to transmit a beamforming report frame used in the sounding protocol. The SIFS indicates a smallest time interval between frames. For example, in the IEEE 802.11ac standard, the SIFS is set to 16 microseconds (μs).

The SIFS refers to a time interval in which responding to data transmitted by the beamformer is impossible in media access control (MAC) software and accordingly, responding to the data transmitted by the beamformer may be enabled in MAC hardware.

A beamforming report frame may be included in a management frame, and the management frame may include a sequence control field. Because the beamforming report frame needs to be generated in hardware, a sequence number may need to be assigned in MAC hardware.

A method by which MAC hardware acquires a sequence number assigned in MAC software does not exist yet, because only a sequence number of a MAC protocol data unit (MPDU) is known and a size of an MPDU stored in a transmission queue is unknown.

Accordingly, it is difficult to properly assign a sequence number to a beamforming report frame, using existing technologies.

SUMMARY

According to an aspect of the present invention, there is provided a method of transmitting a management frame including: acquiring, by a receiver, data of a signal transmitted by a transmitter; selecting either media access control (MAC) software or MAC hardware, to assign a sequence number based on a type of the data; and assigning a sequence number to the management frame based on the data, using either the MAC software or MAC hardware that is selected.

The method may further include providing the MAC hardware with information regarding a range assigned uniquely to the MAC hardware. The assigning may include assigning, by the MAC hardware, a sequence number to the management frame in the range, based on the data.

The assigning may include reading, by the MAC hardware, data associated with a beamforming report frame stored in a transmission queue.

The assigning may include assigning, by the MAC hardware, a sequence number required to be generated in the MAC hardware, in a sequence number range for hardware.

According to another aspect of the present invention, there is provided a method of transmitting a management frame in a receiver, including: receiving a signal transmitted by a transmitter; estimating a channel between the receiver and the transmitter, based on the received signal; generating a beamforming report frame based on information regarding the channel; assigning a sequence number to the beamforming report frame, using MAC software and MAC hardware; and generating a management frame using the beamforming report frame to which the sequence number is assigned.

The assigning may include assigning a sequence number to the beamforming report frame within a range that is set in advance and that is assigned uniquely to the MAC hardware.

The method may further include extracting the range through a register from the MAC software distinguished from the MAC hardware.

The generating may include storing, in a transmission queue by the MAC software, data that is associated with the beamforming report frame and that is received from a logical link control (LLC) layer.

The generating may include storing, in a transmission queue by the MAC software, data that is associated with the beamforming report frame and that is received from a MAC layer management entity (MLME).

The assigning may include reading, by the MAC hardware, data associated with the beamforming report frame from a transmission queue.

The method may further include transmitting the management frame to the transmitter through a physical layer (PHY).

According to another aspect of the present invention, there is provided an apparatus for transmitting a management frame, including: an acquiring unit to acquire data of a signal transmitted by a transmitter; a selecting unit to select either MAC software or MAC hardware, to assign a sequence number based on a type of the data; and an assigning unit to assign a sequence number to the management frame based on the data, using either the MAC software or MAC hardware that is selected.

The assigning unit may assign a sequence number to a beamforming report frame within a range that is set in advance and that is assigned uniquely to the MAC hardware.

The assigning unit may extract the range through a register from the MAC software distinguished from the MAC hardware.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
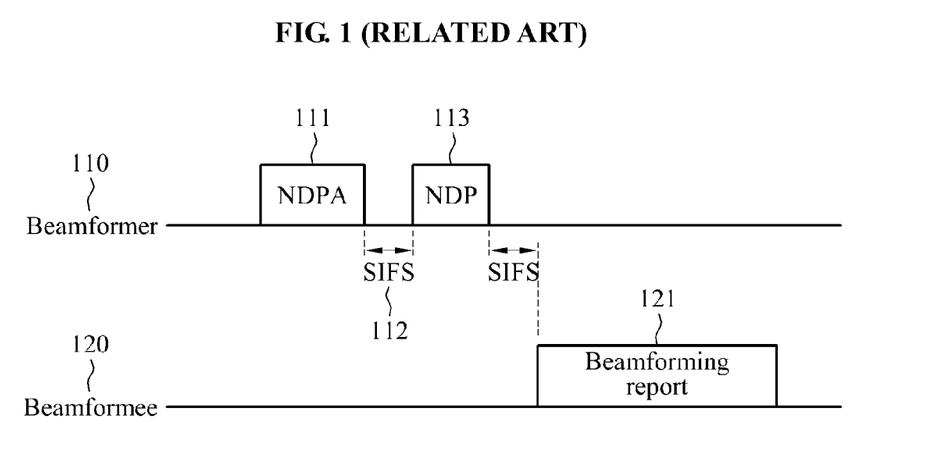
FIG. 1 is a diagram illustrating a conventional sounding protocol in the institute of Electrical and Electronics Engineers (IEEE) 802.11ac standard.

FIG. 1 is a diagram illustrating a conventional sounding protocol in the institute of Electrical and Electronics Engineers (IEEE) 802.11ac standard.

Referring to FIG. 1, in the sounding protocol, a beamformer 110 transmits a signal to a beamformee 120.

The sounding protocol of FIG. 1 may include a null data packet announcement (NDPA) 111, and a null data packet (NDP) 113.

The NDP 113 may be a packet that does not include all media access control (MAC) layer data, and may be used by the beamformee 120 to extract channel information. Since the MAC layer data is not included in the NDP 113, the NDPA 111 needs to be transmitted earlier than the NDP 113, to announce a terminal that needs to receive the NDP 113.

When the NDPA 111 and the NDP 113 are received, the beamformee 120 may include the channel information in a beamforming report frame 121, and may transmit the beamforming report frame 121 including the channel information. The beamformer 110 may generate a steering matrix required for transmit beamforming, using the channel information included in the received beamforming report frame 121. Based on the IEEE 802.11ac standard, the beamformee 120 may be enabled to transmit the beamforming report frame 121, when a short interframe space (SIFS) 112 elapses after receiving of the NDPA 111 and the NDP 113 is finished.

The beamforming report frame 121 may be classified as an Action No Ack frame included in a management frame, in the IEEE 802.11 standard. Hereinafter, a MAC frame structure of the management frame will be described with reference to FIG. 2.

Figure 2:
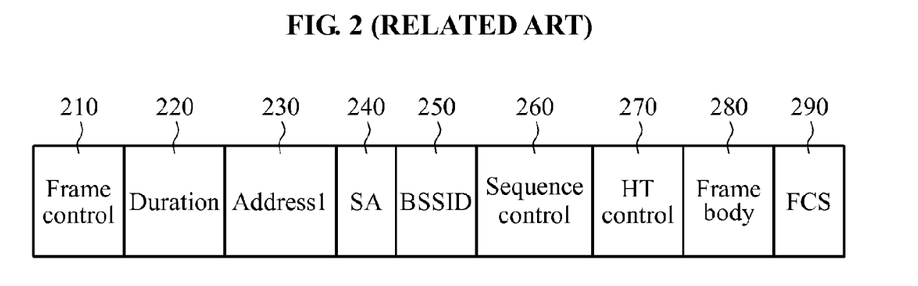
FIG. 2 is a diagram illustrating a media access control (MAC) frame structure of a conventional management frame in the IEEE 802.11 standard.

FIG. 2 is a diagram illustrating a MAC frame structure of a conventional management frame in the IEEE 802.11 standard.

Referring to FIG. 2, the management frame may include a frame control field 201, a duration field 220, an address1 field 230, a source address (SA) field 240, a basic service set identification (BSSID) field 250, a sequence control field 260, a high throughput (HT) control field 270, a frame body field 280, and a frame check sequence (FCS) field 290.

Figure 3:
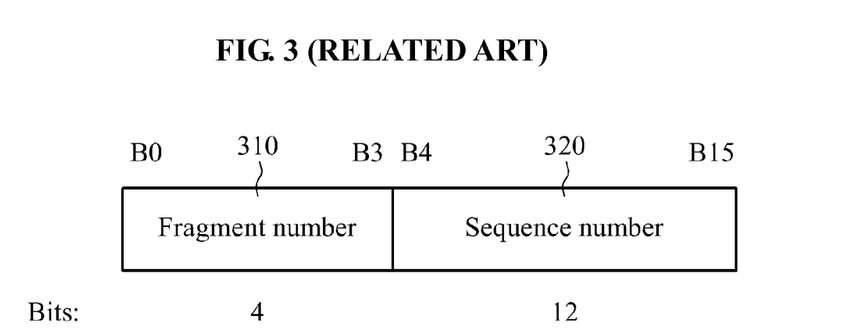
FIG. 3 is a diagram illustrating a structure of a sequence control field in the management frame of FIG. 2.

FIG. 3 is a diagram illustrating a structure of the sequence control field 260 of FIG. 2.

A sequence number field 320 of the sequence control field 260 may indicate numbers (*sequence numbers sequentially assigned to MAC frames. Typically, sequence numbers may be assigned in a MAC software layer. Sequence numbers may be used to determine whether a frame received in a receiver overlaps a frame received in advance. For example, when MAC protocol data unit (MPDU) frames with the same sequence number are consecutively received, a last received frame may be determined as an overlapping frame, and may be deleted.

Figure 4:
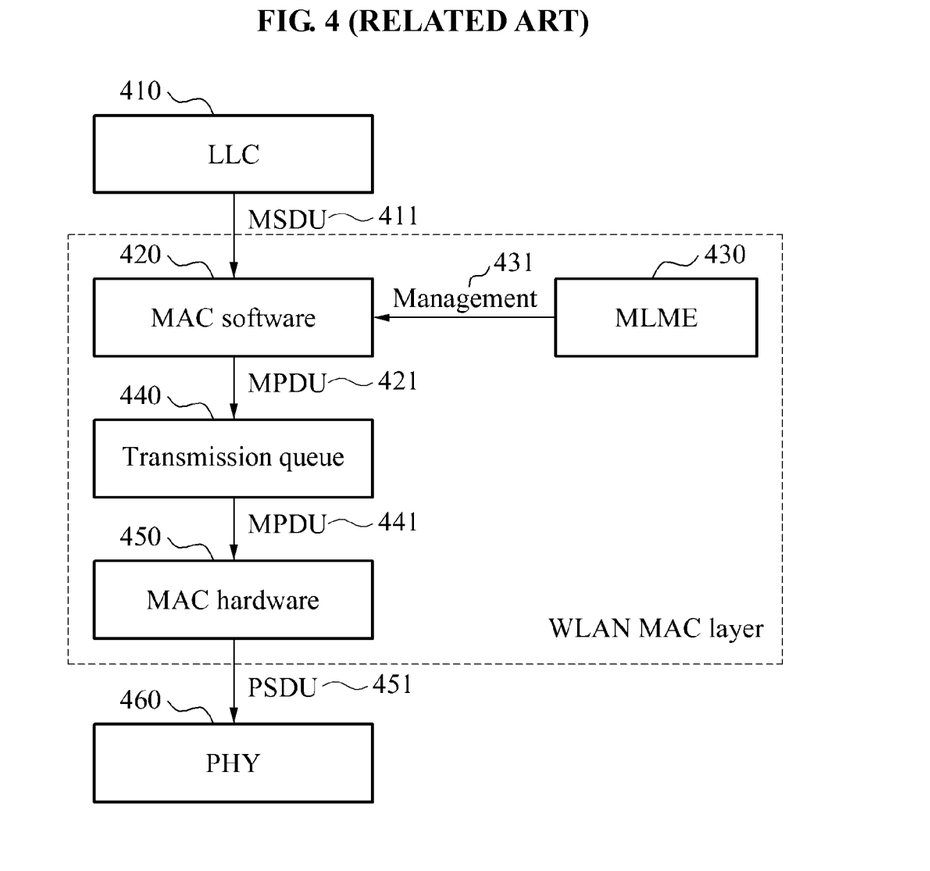
FIG. 4 is a diagram illustrating a structure of a conventional wireless local area network (WLAN) MAC layer.

FIG. 4 is a diagram illustrating a structure of a conventional wireless local area network (WLAN) MAC layer.

The WLAN MAC layer may broadly include MAC software 420, MAC hardware 450, and a MAC layer management entity (MLME) 430. A MAC service data unit (MSDU) frame 411 may be transferred from a logical link control (LLC) layer 410 to the WLAN MAC layer. The MAC software 420 may convert the MSDU frame 411 to an MPDU frame 421, and may store the MPDU frame 421 in a transmission queue 440. Additionally, the MAC software 420 may receive information required to manage a MAC layer (*the WLAN MAC layer (for example, a management frame 431) from the MLME 430, may convert the received information to a management MAC frame, namely, the MPDU frame 421, and may store the MPDU frame 421 in the transmission queue 440. The MAC hardware 450 may read an MPDU frame 441 from the transmission queue 440, based on a timing of a MAC protocol, may convert the MPDU frame 441 to a physical service data unit (PSDU) frame 451, and may transfer the PSDU frame 451 to a physical layer (PHY) 460.

Figure 5:
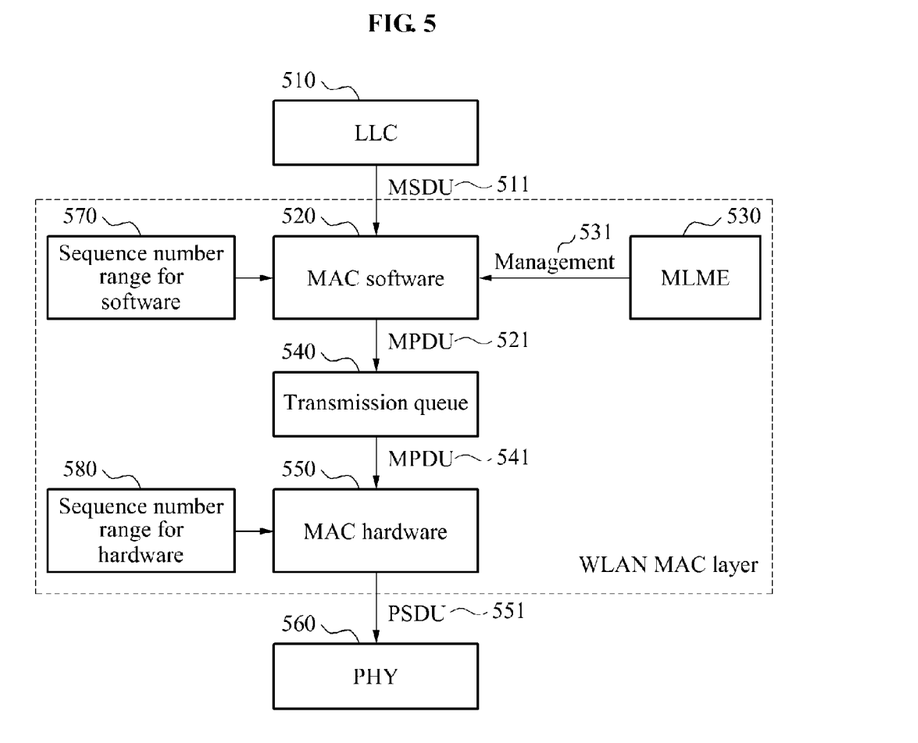
FIG. 5 is a diagram illustrating separation of a range of sequence numbers assigned in MAC software and a range of sequence numbers assigned in MAC hardware according to an embodiment of the present invention.

FIG. 5 is a diagram illustrating separation of a range of sequence numbers assigned in MAC software and a range of sequence numbers assigned in MAC hardware according to an embodiment of the present invention.

In FIG. 5, MAC software 520 may determine a sequence number range 580 for MAC hardware through a register, and may notify MAC hardware 550 of the determined sequence number range 580.

The MAC hardware 550 may sequentially assign sequence numbers to a management frame in the sequence number range 580. The management frame may need to be generated in the MAC hardware 550 and may include a beamforming report frame used in a sounding protocol. The MAC software 520 may assign sequence numbers to the other frames, similarly to an existing scheme. A range of sequence numbers 570 assigned by the MAC software 520 may be obtained by excluding the sequence number range 580.

In FIG. 5, an MSDU frame 511 may be transferred from an LLC layer 510 to a WLAN MAC layer. The MAC software 520 may convert the MSDU frame 511 to an MPDU frame 521, and may store the MPDU frame 521 in a transmission queue 540. Additionally, the MAC software 520 may receive information required to manage a MAC layer (for example, a management frame 531) from an MLME 530, may convert the received information to a management MAC frame, namely, the MPDU frame 521, and may store the MPDU frame 521 in the transmission queue 540. The MAC hardware 550 may read an MPDU frame 541 from the transmission queue 540, based on a timing of a MAC protocol, may convert the MPDU frame 541 to a PSDU frame 551, and may transfer the PSDU frame 551 to a PHY 560.

Figure 6:
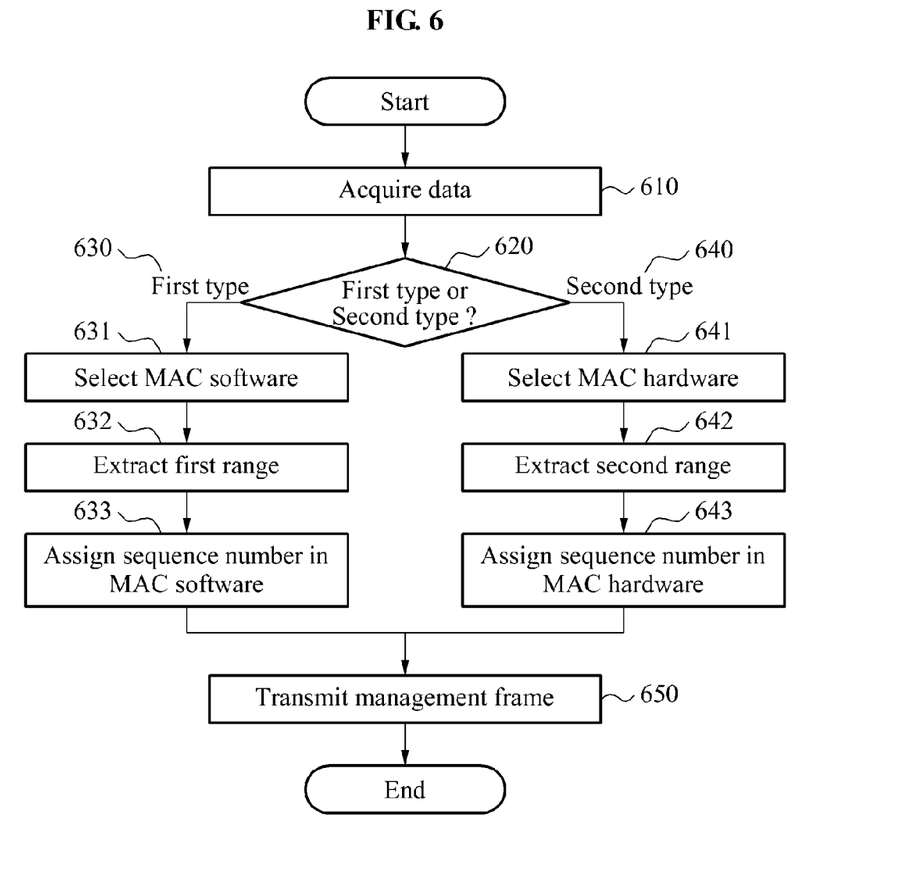
FIG. 6 is a flowchart illustrating a method of separating sequence number ranges, assigning a sequence number, and transmitting a management frame with an assigned sequence number according to an embodiment of the present invention.

FIG. 6 is a flowchart illustrating a method of separating sequence number ranges, assigning a sequence number, and transmitting a management frame with an assigned sequence number according to an embodiment of the present invention.

Referring to FIG. 6, in operation 610, a receiver according to an embodiment of the present invention may acquire data from a transmitter.

The data acquired by the receiver may include, for example, data associated with a beamforming report frame.

In operation 620, the receiver may classify the acquired data into a first type and a second type.

The second type may include data associated with a beamforming report frame.

To assign a sequence number based on a type of data, either MAC software or MAC hardware may be selected.

When the data is classified as the first type in operation 630, the receiver may select the MAC software in operation 631.

When the data is classified as the second type in operation 640, the receiver may select the MAC hardware in operation 641.

When the MAC software is selected in operation 631, the receiver may extract a first range of sequence numbers in operation 632.

When the first range is extracted in operation 632, the receiver may assign a sequence number to a management frame in the MAC software in operation 633.

When the MAC hardware is selected in operation 641, the receiver may extract a second range of sequence numbers in operation 642.

Information regarding a range that is uniquely assigned to the MAC hardware may be provided to the MAC hardware. For example, the receiver may provide information regarding the second range to the MAC hardware.

When the second range is extracted in operation 642, the receiver may assign a sequence number to a management frame in the MAC hardware in operation 643.

For example, the MAC hardware may assign a sequence number to a management frame within the second range based on the data.

In operation 650, the receiver may transmit the management frame to which the sequence number is assigned.

Figure 7:
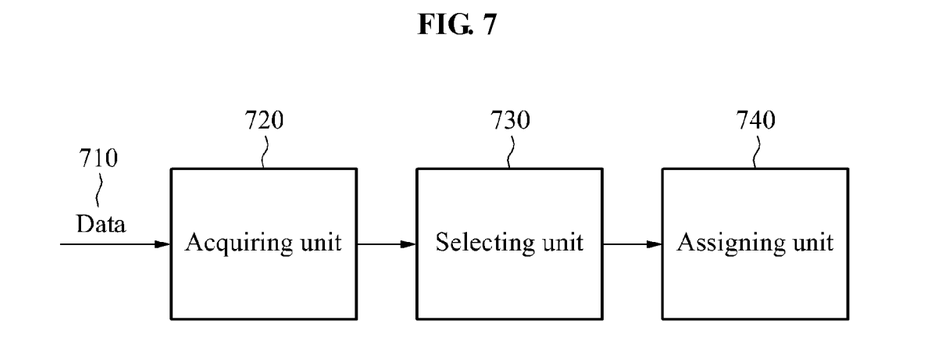
FIG. 7 is a diagram illustrating a receiver to acquire data from a transmitter, to select a range of sequence numbers, and to assign a sequence number, according to an embodiment of the present invention.

FIG. 7 is a diagram illustrating a receiver to acquire data from a transmitter, to select a range of sequence numbers, and to assign a sequence number, according to an embodiment of the present invention.

Referring to FIG. 7, the receiver may include an acquiring unit 720, a selecting unit 730, and an assigning unit 740.

The acquiring unit 720 may acquire data 710 of a signal transmitted by the transmitter.

The selecting unit 730 may select either MAC software or MAC hardware, based on the acquired data 710, to assign a sequence number.

The assigning unit 740 may assign a sequence number to a management frame based on the data 710, using one of the MAC software and the MAC hardware that is selected by the selecting unit 730.

Additionally, the assigning unit 740 may assign a sequence number to a beamforming report frame within a range that is set in advance and that is uniquely assigned to the MAC hardware.

In addition, the assigning unit 740 may extract the range, through a register from the MAC software that is distinguished from the MAC hardware.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of transmitting a management frame, the method comprising:

acquiring, by a receiver, data of a signal transmitted by a transmitter;

selecting, based on a type of the data, one of a media access control (MAC) software and a MAC hardware;

when the MAC hardware is selected, assigning, using the MAC hardware, a sequence number in a first sequence number range to a management frame generated in the MAC hardware;

when the MAC software is selected, assigning, using the MAC software, a sequence number in a second sequence number range to an other management frame, wherein the first sequence number range corresponding to the MAC hardware is different from the second sequence number range corresponding to the MAC software.

2. The method of claim 1, further comprising:
providing the MAC hardware with information regarding a range assigned to the MAC hardware,
wherein assigning the sequence number to the management frame using the MAC hardware comprises assigning, by the MAC hardware, a sequence number in the range to the management frame.

3. The method of claim 1, wherein assigning the sequence number to the management frame using the MAC hardware comprises reading, by the MAC hardware, data associated with a beamforming report frame stored in a transmission queue.

4. The method of claim 1, wherein assigning the sequence number to the management frame using the MAC hardware comprises assigning, by the MAC hardware, a sequence number required to be generated in the MAC hardware, in a sequence number range for hardware.

5. A method of transmitting a management frame in a receiver, the method comprising:
receiving a signal transmitted by a transmitter;
extracting channel information regarding a channel between the receiver and the transmitter, based on the received signal;
generating a beamforming report frame based on the channel information regarding the channel;
determining a first sequence number range corresponding to a media access control (MAC) hardware;
determining a second sequence number range corresponding to MAC software;
assigning a sequence number in the first sequence number range to the beamforming report frame; and
assigning a sequence number in the second sequence number range to an other management frame,
wherein the first sequence number range corresponding to the MAC hardware is different from the second sequence number range corresponding to the MAC software.

6. The method of claim 5, wherein the first sequence number range is set in advance and is assigned uniquely to the MAC hardware.

7. The method of claim 6, further comprising:
extracting the first sequence number range through a register from the MAC software distinguished from the MAC hardware.

8. The method of claim 5, wherein generating the beamforming report frame comprises storing, in a transmission queue by the MAC software, data that is associated with the beamforming report frame and that is received from a logical link control (LLC) layer.

9. The method of claim 5, wherein generating the beamforming report frame comprises storing, in a transmission queue by the MAC software, data that is associated with the beamforming report frame and that is received from a MAC layer management entity (MLME).

10. The method of claim 5, wherein assigning the sequence number to the beamforming report frame comprises reading, by the MAC hardware, data associated with the beamforming report frame from a transmission queue.

11. An apparatus for transmitting a management frame, the apparatus comprising:
an acquiring unit to acquire data of a signal transmitted by a transmitter;
a selecting unit to select, based on a type of the data, one of a media access control (MAC) software and a MAC hardware; and
an assigning unit to assign a sequence number to the management frame,
wherein the assigning unit assigns a sequence number in a first sequence number range to a management frame generated in the MAC hardware when the MAC hardware is selected by the selecting unit,
wherein the assigning unit assigns a sequence number in a second sequence number range to an other management frame when the MAC software is selected by the selecting unit, and
wherein the first sequence number range corresponding to the MAC hardware is different from the second sequence number range corresponding to the MAC software.

12. The apparatus of claim 11, wherein when the assigning unit assigns the sequence number using the MAC hardware, the assigning unit assigns a sequence number to a beamforming report frame within a range that is set in advance and that is assigned uniquely to the MAC hardware.

13. The apparatus of claim 12, wherein the assigning unit extracts the range through a register from the MAC software distinguished from the MAC hardware.

* * * * *